US008683359B2

(12) United States Patent
Jugel

(10) Patent No.: US 8,683,359 B2
(45) Date of Patent: Mar. 25, 2014

(54) IN-PLACE USER INTERFACE AND DATAFLOW MODELING

(75) Inventor: Uwe Jugel, Dresden (DE)

(73) Assignee: SAP AG, Walldorf (DE)

( * ) Notice: Subject to any disclaimer, the term of this patent is extended or adjusted under 35 U.S.C. 154(b) by 369 days.

(21) Appl. No.: 12/781,837

(22) Filed: May 18, 2010

(65) Prior Publication Data
US 2011/0289439 A1   Nov. 24, 2011

(51) Int. Cl.
*G06F 3/00* (2006.01)

(52) U.S. Cl.
USPC ............................. 715/762; 715/763; 715/967

(58) Field of Classification Search
USPC .......................................... 715/762, 763, 967
See application file for complete search history.

(56) References Cited

U.S. PATENT DOCUMENTS

| | | | | |
|---|---|---|---|---|
| 5,487,141 A * | 1/1996 | Cain et al. | ...................... | 715/764 |
| 5,651,107 A * | 7/1997 | Frank et al. | ...................... | 715/768 |
| 7,509,586 B2 * | 3/2009 | Davidovich et al. | ........... | 715/767 |
| 7,568,162 B2 * | 7/2009 | Gunturi et al. | ................. | 715/763 |
| 7,685,527 B2 * | 3/2010 | Yan et al. | ....................... | 715/762 |
| 7,979,804 B1 * | 7/2011 | Schang | ........................... | 715/763 |
| 2004/0019875 A1 * | 1/2004 | Welch | ............................ | 717/109 |
| 2005/0210398 A1 * | 9/2005 | Novak et al. | .................... | 715/765 |
| 2008/0109785 A1 | 5/2008 | Bailey | | |
| 2008/0270919 A1 * | 10/2008 | Kulp et al. | ...................... | 715/762 |
| 2009/0013267 A1 * | 1/2009 | Cudich et al. | ................. | 715/762 |
| 2009/0024937 A1 * | 1/2009 | Lauff et al. | .................... | 715/762 |
| 2009/0024939 A1 * | 1/2009 | Cudich et al. | ................. | 715/762 |
| 2009/0100358 A1 * | 4/2009 | Lauridsen et al. | ............ | 715/762 |

OTHER PUBLICATIONS

Uwe Jugel; Visual, In-place Data Flow Modeling; Proceedings of AVI (Advanced Visual Interfaces) 2010—Rome, Italy; ACM New York, NY, USA; 2010.
ServFace website—Seventh Framework Programme; Service Annotations for User Interface Composition; http://www.servface.eu; ServFace; Web—Accessed May 25, 2010.
Swing GUI Builder (Matisse) website—NetBeans; NetBeans IDE 6.8 Features; http://netbeans.org/features/java/swing.html; Oracle Corporation; Web—Accessed May 25, 2010.
Yahoo Pipes website—Pipes; Pipes: Rewire the web, Featured Pipe: Aggregated News Alerts; http://pipes.yahoo.com/pipes; Yahoo! Inc., Web—Accessed May 25, 2010.
F. Daniel, F. Casati, B. Benatallah, and M. Shan; Hosted Universal Composition: Models, Languages and Infrastructure in mashArt. Proceedings of the 28th International Conference on Conceptual Modeling, Gramado, Brazil; pp. 428-443; Springer-Verlag Berlin, Heidelberg; 2009 (http://portal.acm.org/citation.cfm?id=1694170.1694213).

(Continued)

*Primary Examiner* — Shen Shiau

(57) ABSTRACT

Systems and methods for in-place user interface (UI) and dataflow modeling, including a number of UI elements of a graphical user interface (GUI) grouped in several GUI fragments. A first fragment of the several GUI fragments is switched from UI design mode to dataflow design mode, where the UI elements are replaced by data elements. The data elements in the first fragment may be related to define one part of a dataflow. A second fragment of the several GUI fragments is separately switched from UI design mode to dataflow design mode, where the UI elements are replaced by data elements. The data elements of the second fragment may be related to define another part of the dataflow. A relationship is created between the data elements of the first fragment and the data element of the second fragment based on the dataflow.

20 Claims, 10 Drawing Sheets

(56) References Cited

OTHER PUBLICATIONS

Fabrice Desré; Open Mashups—User generated applications for the masses; Proceedings of XTech 2008: "The Web on the Move": May 6-9, 2008, Dublin, Ireland; IDEAlliance Inc., Alexandria, Virginia; 2008 (http://2008.xtech.org/public/asset/attachment/388).

M. Feldmann, J. Janeiro, T. Nestler, G. Huebsch, U. Jugel, A. Preussner, and A. Schill; An Integrated Approach for Creating Service-Based Interactive Applications; Proceedings of the 12th IFIP TC 13 International Conference on Human-Computer Interaction: Part II, Uppsala, Sweden; pp. 896-899; Springer-Verlag Berlin, Heidelberg; 2009 (http://portal.acm.org/citation.cfm?id=1616348&dl=GUIDE&coll=GUIDE&CFID=86418129&CFTOKEN=82368239#).

Volker Hoyer and Marco Fischer; Market Overview of Enterprise Mashup Tools; Proceedings of the 6th International Conference on Service Oriented Computing, Sydney, Australia; pp. 708-721; Springer-Verlag Berlin, Heidelberg, 2008 (http://mashup.pubs.dbs.uni-leipzig.de/files/Hoyer2008MarketOverviewofEnterpriseMashupTools.pdf).

V. Hoyer, K. Stanoesvka-Slabeva, T. Janner, and C. Schroth; Enterprise Mashups: Design Principles towards the Long Tail of User Needs; Proceedings of the 2008 IEEE International Conference on Services Computing—vol. 2, Honolulu, Hawaii, USA; pp. 601-602. IEEE Computer Society, Washington, DC, USA; 2008 (http://www.alexandria.unisg.ch/export/DL/45602.pdf).

D. Lizcano, J. Soriano, M. Reyes, and J. Hierro; EzWeb/FAST: Reporting on a Successful Mashup-based Solution for Developing and Deploying Composite Applications in the Upcoming "Ubiquitous SOA"; Proceedings of the 2008 The Second International Conference on Mobile Ubiquitous Computing, Systems, Services and Technologies, Valencia, Spain; pp. 488-495; IEEE Computer Society, Washington, DC, USA; 2008 (http://portal.acm.org/citation.cfm?id=1447566.1448140#).

B. Myers, S. E. Hudson, and R. Pausch; Past, present, and future of user interface software tools; ACM Transactions on Computer-Human Interaction (TOCHI), vol. 7, Issue 1—Special issue on human-computer interaction in the new millennium, Part 1; pp. 3-28; ACM New York, NY, USA; 2000 (http://portal.acm.org/citation.cfm?id=344959&dl=GUIDE&coll=GUIDE&CFID=91426426&CFTOKEN=32799421).

NI LabVIEW website—National Instruments; The Software That Powers Virtual Instrumentation; http://www.ni.com/labview; National Instruments Corporation; Web—Accessed May 25, 2010.

J. Yu, B. Benatallah, R. Saint-Paul, F. Casati, F. Daniel, and M. Matera; A Framework for Rapid Integration of Presentation Components; Proceedings of the 16th International Conference on World Wide Web, Banff, Alberta, Canada; pp. 923-932; ACM New York, NY, USA, 2007 (http://citeseerx.ist.psu.edu/viewdoc/download?doi=10.1.1.91.8553&rep=rep1&type=pdf).

Jaroslaw Staniek; KDETM a graphical desktop environment ("K" Desktop Environment) for UNIX systems—Tabbed, Context-Aware Application's Workspace; KDE Developer's Journals, 2007 (http://www.kdedevelopers.org/node/2955).

Dana Nourie; Getting Started With the NetBeansTM IDE Tutorial; Oracle Sun Developer Network; 2008 (http://java.sun.com/developer/onlineTraining/tools/netbeans_part1/).

European Search Report for European Application 11003374.3-1243, mailed on Jul. 11, 2011; EPO Rijswijk; Netherlands; 6 pages.

* cited by examiner

IN-PLACE USER INTERFACE AND DATAFLOW MODELING

TECHNICAL FIELD

The field of the invention relates generally to data processing and digital processing systems. More specifically, the field concerns providing graphical user interface for in-place user interface and dataflow modeling.

BACKGROUND

For many years, research and development in the area of software engineering has implemented different concepts for facilitating software production. One such concept regards graphical user interface (GUI) builders, also known as GUI designers. Generally, a GUI builder is a software tool for programming computer applications that simplifies the creation of GUIs by allowing the developers to arrange user interface (UI) controls using visual editors, including drag-and-drop editors, "what-you-see-is-what-you-get" (WYSI-WYG) editors, etc. GUI builders typically skip the manual coding of each UI control parameters, and provide visual feedback before the code is executed.

Usually, a GUI is a part of an event-driven software application, where the flow of the execution of a computer program is determined by events, e.g., user actions, messages, input from other applications, etc. When a particular event happens, it may trigger changes in the values of a number of variables or data elements causing a dataflow. The dataflow of a computer application determines that when a value of a data element changes, values of one or more related data elements change as well. Often, the UI controls of GUIs are based on dataflows. For example, when a UI control receives a user action, it may trigger changes in series of values of related data elements, according to an underlying dataflow. Some of the UI controls or elements of a GUI themselves may correspond to data elements of a dataflow, and may show one or more current values of the data elements. A growing number of vendors of GUI builders supplement the UI design with dataflow design capabilities. Such combination of GUI design tools and dataflow design tools can be found in Microsoft Access™; NetBeans™ integrated development environment (IDE); Yahoo Pipes™; etc.

Those software development tools that allow switching between different design tools (e.g., UI design mode, dataflow design mode, source code editor mode, etc.) help the creation of software applications in various ways. For example, one application developer may create the UI design and the dataflow design of a computer application in parallel within the same application builder tool by switching between different design modes. This approach increases productivity and minimizes the risk of errors in the integration between application functionality, dataflow, and GUI. However, there are some drawbacks in the simultaneous work with different software design modes. For example, the software developers may be overloaded with information, especially when working on complex applications. Other drawbacks may be caused by inefficient UI controls interaction during development, poor layout realism (caused by the attempts to display all layout and data aspects at once), a tendency of cluttering of the UI controls or of the data elements during the development process that needs to be regularly resolved, etc.

SUMMARY

Various embodiments of systems and methods for in-place user interface (UI) and dataflow modeling are described herein. A number of UI elements of a graphical user interface (GUI) are grouped in several GUI fragments. Each of the GUI fragments includes one or more UI elements. In one aspect, a first fragment of the several GUI fragments is switched from UI design mode to dataflow design mode, where, instead of UI elements of the first GUI fragment, one or more data elements are included. The data elements in the first fragment may be related by one or more relationship elements based on a dataflow. In another aspect, a second fragment of the several GUI fragments is separately switched from UI design mode to dataflow design mode, where, instead of the UI elements of the second GUI fragment, one or more data elements are included. The data elements of the second fragment may be related by one or more relationship elements based on the dataflow. In yet another aspect, a relationship is created between a data element of the first fragment and a data element of the second fragment based on the dataflow.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The embodiments are illustrated by way of example and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for in-place user interface and dataflow modeling are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1A:
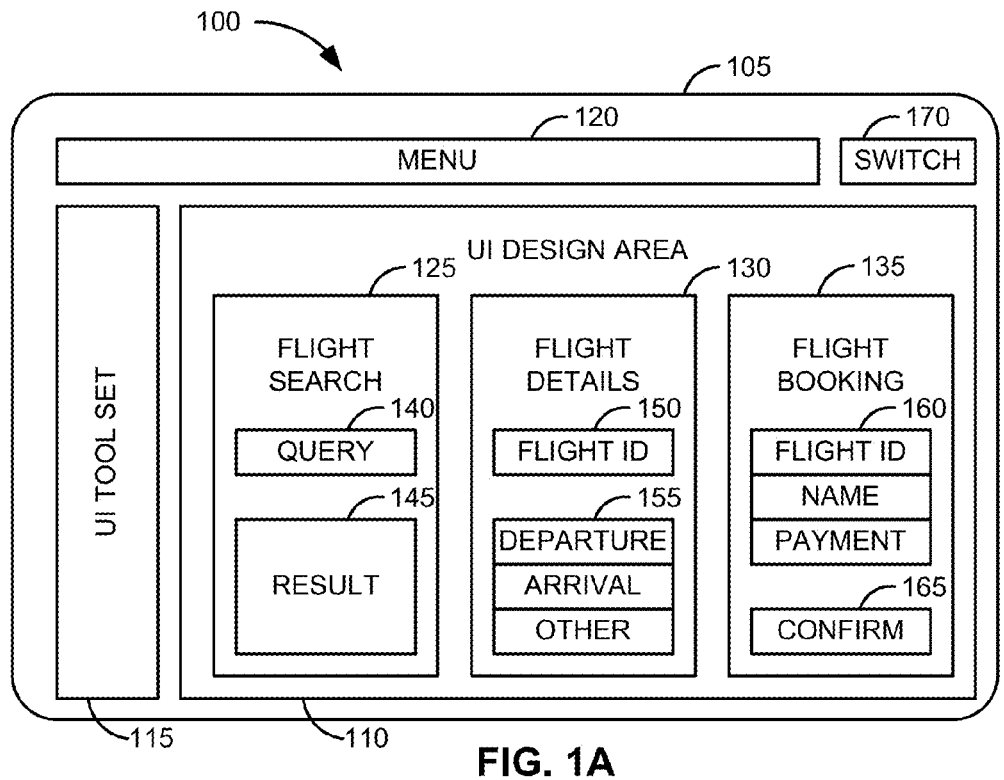
FIG. 1A is a block diagram illustrating a graphical user interface (GUI) of a prior art GUI builder tool providing simultaneous user interface (UI) and dataflow modeling.

FIG. 1A is a block diagram that shows an exemplary graphical user interface (GUI) 105 of a prior art GUI builder tool 100. The GUI 105 includes user interface (UI) design area 110 where application developers can create the structure of GUIs for different software applications. In the UI design area 110, the application developers may add new UI elements and UI controls, arrange the UI elements and controls, change their properties, e.g., color, shape, behavior, etc. In this document, the terms "UI element" and "UI control" are used interchangeably to address both UI controls and UI elements. New UI elements may be added to the UI design area 110 by drag-and-drop operations using UI toolset 115. Alternatively, new UI elements may be included in the UI design area 110 by selecting corresponding commands from menu 120 or from the UI toolset 115.

UI design area 110 is used by software developers to design a single GUI page of a software application. In FIG. 1A, an exemplary GUI for a flight booking application is presented, including UI container elements "flight search" 125, "flight details" 130 and "flight booking" 135. The three UI container elements 125, 130 and 135 represent the three main steps a user takes to book a flight, e.g., searching for relevant flights, checking the details of a particular flight, and booking the flight. Each of the UI container elements represents a GUI fragment where several simpler UI elements are grouped. Each of the simpler UI elements may correspond to a particular function of the software application, or may present a particular type of information.

Container UI element "flight search" 125 groups UI elements "query" 140 and "result" 145. In "query" UI element 140 search criteria for flights of interest may be described, e.g., search string, codes, airlines, jet models, etc. The "result" UI element 145 may dynamically list flights matching the criteria in "query" 140. Accordingly, when the data in "query" UI element 140 changes, the data in "result" UI element 145 also changes.

The details about a particular flight are provided with the help of UI elements 150 and 155 included in the container UI element "flight details" 130. The necessary controls for booking a particular flight are grouped in UI container element "flight booking" 135. A flight from the "result" UI element 145 may be selected, and the details for the selected flight may automatically appear in UI controls 150 and 155 and 160. Additional booking data may be entered or may be automatically loaded in UI element 160. Finally, the booking as described in UI element 160 may be submitted with the help of the UI control "confirm" 165.

The flow of information that starts with providing search criteria in "query" UI element 140, and ends with submitting the booking with "confirm" UI control 165 is based on an underlying dataflow. The dataflow itself needs to be created or defined during the application development. The GUI builder tool 100 provides means for modeling dataflows. The GUI builder tool 100 may switch from UI design mode to dataflow design mode as a response to several commands, e.g., by selecting "switch" UI control 170, by selecting a relevant command from menu 120, by a key combination, etc.

Figure 1B:
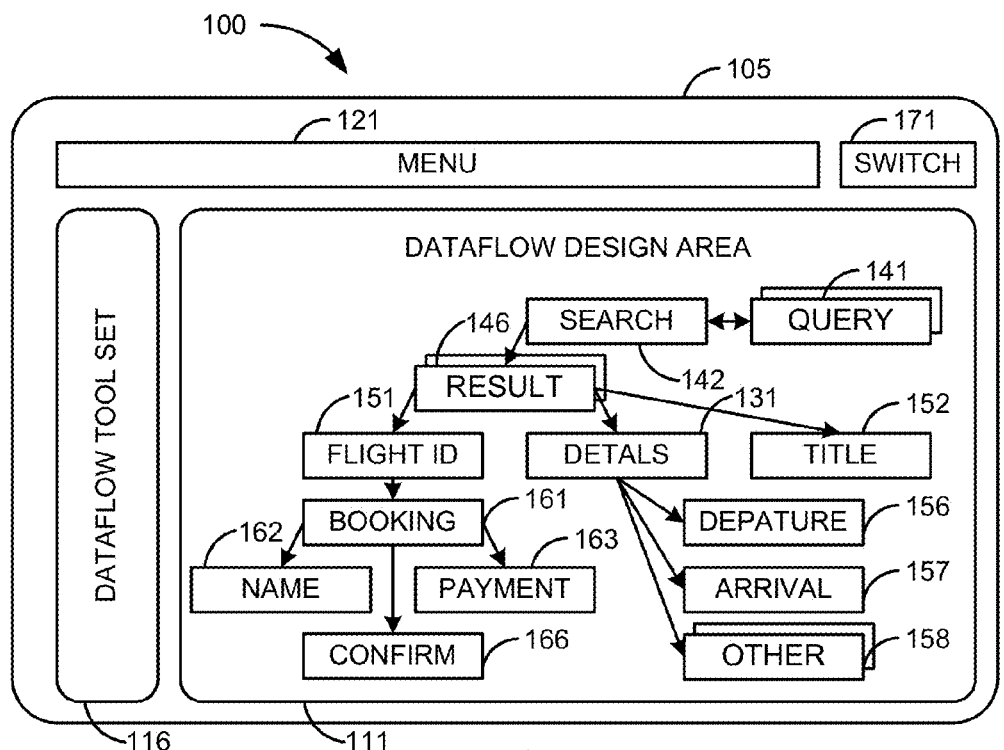
FIG. 1B is a block diagram illustrating a GUI of the prior art GUI builder tool providing simultaneous UI and dataflow modeling.

FIG. 1B is a block diagram that shows exemplary graphical user interface (GUI) 105 of the prior art GUI builder tool 100 in dataflow design mode. The GUI 105 includes dataflow design area 111 where application developers can define dataflows for different software applications. In the dataflow design area 111, new data elements and new relationship elements may be added, the data element and the relationships between the data elements may be arranged, etc. The new data elements and the new relationship elements may be added to the dataflow design area 111 using drag-and-drop operations from dataflow toolset 116. Alternatively, data elements and relationship elements may be inserted in the dataflow design area 111 by selecting corresponding commands from menu 121, or the dataflow toolset 116.

When compare FIG. 1A with FIG. 1B, it can be noticed that UI design area 110 and UI toolset 115 in FIG. 1A are replaced by dataflow design area 111 and dataflow toolset 116 in FIG. 1B, respectively. Menu 120 in FIG. 1A and menu 121 in FIG. 1B may be the same, ensuring access to the same set of commands. Alternatively, menu 120 and menu 121 may differ, providing commands pertinent to the current design mode of the GUI builder tool 100. The "switch" UI control 170 in FIG. 1A and "switch" UI control 171 in FIG. 1B may be used to toggle between UI and dataflow design modes.

In dataflow design area 111, UI elements are replaced by dataflow elements, e.g., by data elements and relationships. Usually, one or more dataflow elements correspond to a UI element. A data element may represent information, e.g., one or more values associated with the data element. Additionally, a data element may include represent actions, e.g., methods, functions, procedures, decision blocks, etc. When a value of a data element is changed, it may trigger changes in other related data elements. The relationships define dependencies between the data elements. In many cases, the dataflow elements correspond to data structures, e.g., some data elements may correspond to fields (columns) of database tables, some relationship elements may correspond to database relationships, etc. One technique for dataflow modeling may include defining data tables and database relationships. Another common technique for dataflow modeling is the creating of graph structures. Dataflows could be modeled as an acyclic or maybe even a cyclic graph. For example, a tree is a restricted acyclic graph and may be used for modeling dataflows, where the nodes correspond to data elements, and the edges or arrows between the nodes correspond to the relationships, as illustrated in FIG. 1B.

According to FIG. 1B, data element "search" 142 represents a search method performed in a flights database. When activated, "search" 142 reads a query stored in "query" data element 141. Data for the flights matching the selected search query is received in "result" data element 146. The data for a particular flight, including identification (ID), could be distributed between data elements "flight ID" 151, "title" 152, and "details" 131. The data element "details" 131 is further related to data elements "departure" 156, "arrival" 157 and "other" 158, where the relevant information about the flight is stored in order to be displayed by the corresponding UI elements in the application GUI. Data element "booking" 161 is related to "flight ID" 151, and represents the next stage of the dataflow, where the particular flight is booked. Values for data elements "name" 162 and "payment" 163 need to be provided, before submitting the booking at "confirm" data item 166.

The GUI builder tool 100 of FIG. 1A and FIG. 1B demonstrates a typical approach for simultaneous design of a GUI and a dataflow of a software application. The GUI builder tool 100 usually contains a program code editor that may be visualized in the place of either UI design area 110 or dataflow design area 111, e.g., as another design mode. Alternatively, the programming code editor may open in a separate window. Other modes could be also supported by the GUI builder tool 100, including database design mode, execution mode, etc. The "switch" UI controls 170 and 171 may be used to toggle the available modes of the GUI builder tool 100.

For the software developers who use GUI builder tools similar to the GUI builder tool 100, it is not always easy to follow the correspondence between the UI elements and the data elements, especially when complex software applications are created. It becomes even more complicated when a new UI element is added or an old UI element is changed. Corresponding data elements have to be inserted or redistributed within the tree structure of the dataflow, ensuring the necessary relationships.

Figure 2A:
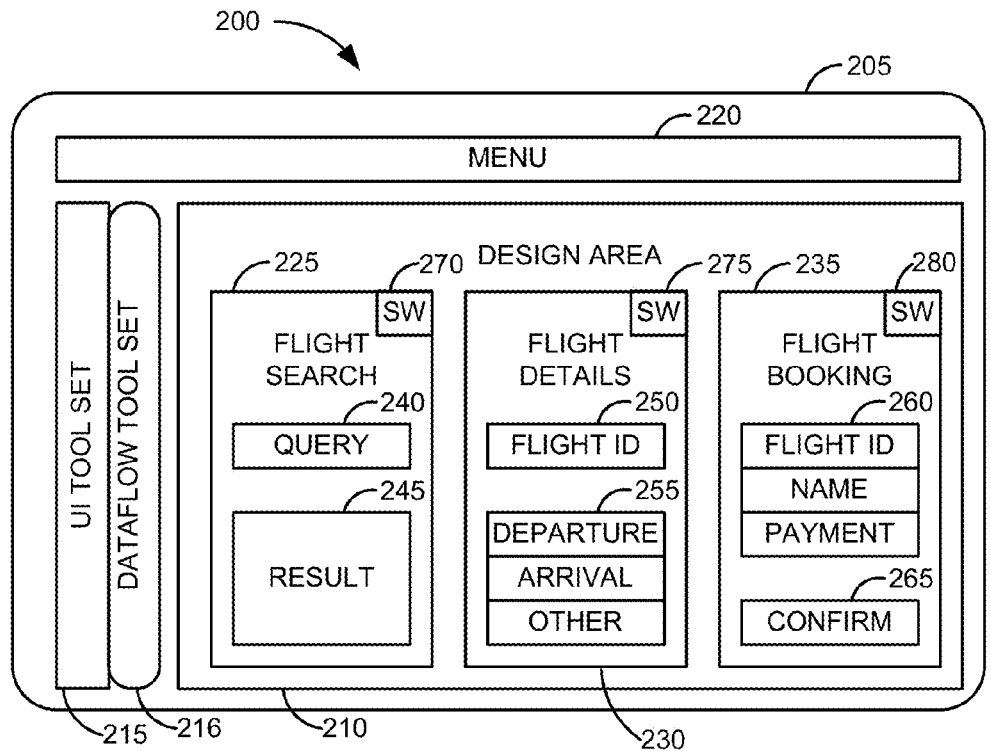
FIG. 2A is a block diagram illustrating a GUI of a GUI builder tool providing in-place user UI and dataflow modeling, according to one embodiment.
Figure 2B:
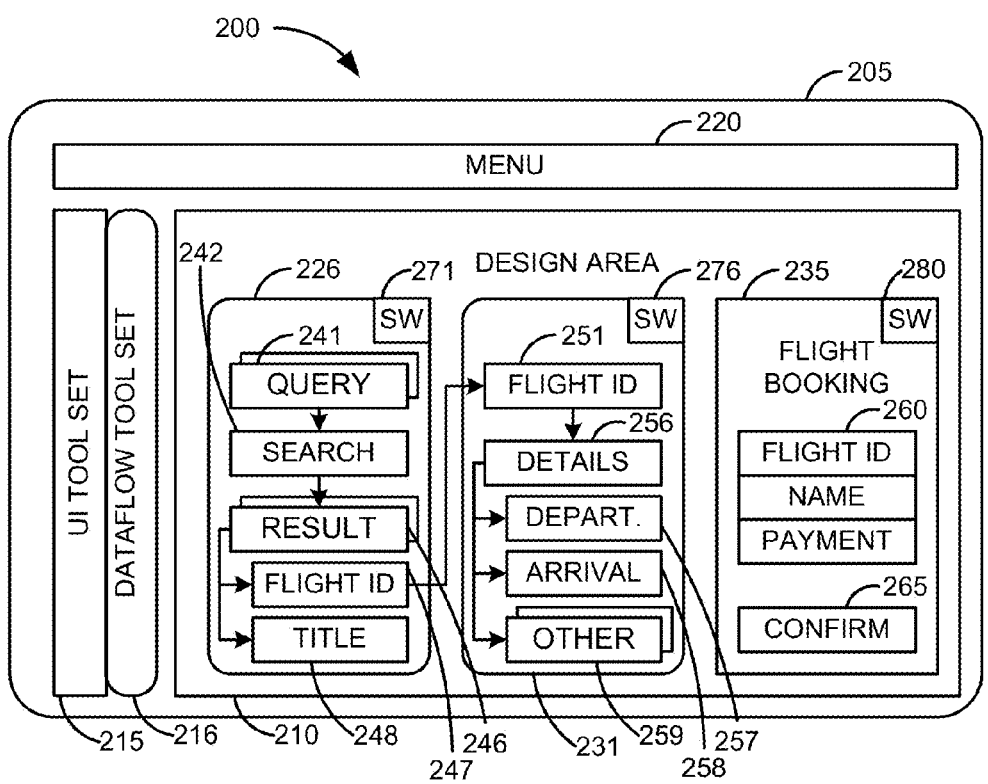
FIG. 2B is a block diagram illustrating a GUI of the GUI builder tool providing in-place user UI and dataflow modeling, according to one embodiment.

FIG. 2A and FIG. 2B illustrate an approach for providing in-place dataflow modeling in a GUI builder tool 200, according to one embodiment of the invention. The users interact with the GUI builder tool 200 through GUI 205 as shown in the figures. GUI 205 includes design area 210, where UIs and dataflows of software applications are created. Further, GUI 205 includes UI toolset 215 and dataflow toolset 216, according to one embodiment of the invention. Menu 220 provides access to the commands and settings of the GUI builder tool 200.

In contrast with the prior art, GUI builder tool 200 does not use two separate design views within the GUI 205, where design area 210 does not switch between modes. The modeling of a GUI and an underlying dataflow for a software application is accomplished within the same design area 210. To demonstrate the in-place UI and dataflow modeling in FIG. 2A and FIG. 2B, the exemplary flight booking application from FIG. 1A and FIG. 1B is used. The UI modeling is performed in-place with the dataflow modeling to diminish the difficulties met by software developers when working simultaneously with two different design environments.

Similar to the prior art example, the design area 210 in FIG. 2A includes UI container elements "flight search" 225, "flight details" 230 and "flight booking" 235. The UI container element "flight search" 225 groups UI elements "query" 240 and "result" 245 that will help the users of the flight booking application to find and select particular flights. The UI container element "flight details" 230 includes UI element "flight ID" 250 and UI element 255 to show details for a particular flight. Finally, the users of the flight booking system can provide booking information and confirm the booking with the UI elements 260 and 265 included in "flight booking" UI container element 235.

To each of the container UI elements 225, 230 and 235 is assigned a "switch" UI control, respectively 270, 275 and 280. Each of the UI container elements 225, 230 and 235 may be separately switched between different design modes using the UI controls 270, 275 and 280, according to one embodiment of the invention. In this way, dataflow modeling can be done in-place with UI modeling by separate fragments corresponding to the UI container elements.

FIG. 2B illustrates GUI builder tool 200, where design area 210 includes fragments 226 and 231 in dataflow design mode, according to one embodiment. Fragments 226 and 231 correspond to UI container elements 225 and 230 in FIG. 2A, respectively. Each of the fragments 226 and 231 in dataflow design mode includes dataflow elements related to the UI elements grouped in the corresponding UI container elements 225 or 230. As a result, the software developers need to manage fewer dataflow elements at a time, related to UI elements, within the same place of GUI 205. The dataflow elements pertinent within fragments 226 and 231 are presented by boxes related to each other to define a dataflow, according to one embodiment. The dataflow may be defined using well known interface metaphors, e.g., visuals, actions and procedures that could be dragged-and-dropped from dataflow toolset 216, or defined using menu controls from menu 220.

The adjacent "switch" UI controls 271 and 276 ensure toggling of fragments 226 and 231 from dataflow design mode to UI design mode, respectively. For better usability and layout realism, especially for advanced users, the "switch" UI controls 270-280 could be hidden and their functionality replaced by hot keys, for example. Fragment 226 includes data elements "query" 241, "search" 242, "result" 246, "flight ID" 247 and "title" 248. The relationships between the data elements in fragment 226 define a dataflow that is similar to the dataflow presented in FIG. 1B In FIG. 2B, the relationship elements are represented by arrows between the related data elements showing the flow of information. In the same time, it is much easier for a software developer to follow the correspondence between the UI elements 240 and 245 of container UI element "flight search" 225 (FIG. 2A), and the data elements 241, 242, 246, 247 and 248 of fragment 226. Such an organization of the software development process is more intuitive, convenient and efficient. It is not necessary to jump between two totally different design areas. The in-place modeling facilitates the matching between a group of logically connected UI elements of a software application, and an autonomous part of a dataflow of the software application.

For example, it is easy to see the correspondence between UI element "query" 240 in FIG. 2A, and data elements "query" 241 and "search" 242 in FIG. 2B. A user may enter search criteria in "query" UI element 240. The search criteria may be stored in "query" data element 241. A UI control corresponding to the "search" data element 242 may not be displayed in the GUI of the flights booking application. With the act of entering the criteria, "search" data element 242 may activate the assigned search method. Alternatively, a button UI control corresponding to the "search" data element 242 may be included in the UI model. The button may be used to submit the search criteria entered in "query" UI element 240. Similarly, the correspondence between UI element "result" 246 in FIG. 2A, and data elements "result" 246, "flight ID" 247 and "title" 248 in FIG. 2B is easily noticeable. The UI control "result" 245 may not show the values of "flight ID" data element 247, but only the values of "title" data element 248 to make the GUI of the application simpler.

The dataflow of the software application for booking flights continues at fragment 231 where data elements "flight ID" 251, "details" 256, "departure" 257, and "other" 259 are included. The data elements of fragment 231 correspond to UI elements 250 and 255 grouped in UI container element 230 in FIG. 2A. Data element "flight ID" 251 is related to data element "flight ID" 247 of fragment 226. This is how the part of the application dataflow in fragment 226 connects with the part of the application dataflow in fragment 231. Design area 210 in FIG. 2B also includes container UI element "flight booking" 280 still in UI design mode, where UI elements 260 and 265 are included. The container UI element "flight booking" 280 may be switched to dataflow design mode to model the last part of the application dataflow by arranging the necessary dataflow elements and adding one or more relationships with the dataflow elements of the other dataflow parts.

In an alternative embodiment, design area 210 may open as a popup window. UI toolset 215 and dataflow toolset 216 may be hidden, and popup in separate windows simultaneously or separately, depending on whether the user is focused to a UI element, or to a dataflow element. Further, the adding of a UI element in UI design mode may automatically add one or more corresponding dataflow elements to the dataflow design mode, and vice versa. Different ways for switching between modes of the fragments in the design area 210 may be used besides the adjacent "switch" UI controls 270 to 280, e.g., drag-and-drop operations, selecting corresponding menu items, pressing keyboard keys, etc. The modeling of UIs and dataflows may be facilitated by supplementary visual effects like, for example, highlighting compatible data elements during relationship definitions. The embodiments of the invention may not be limited to GUI builder tools, or to design environments. Similar approaches for in-place switching may be applied in other GUI environments, where different view modes are involved.

Figure 3:
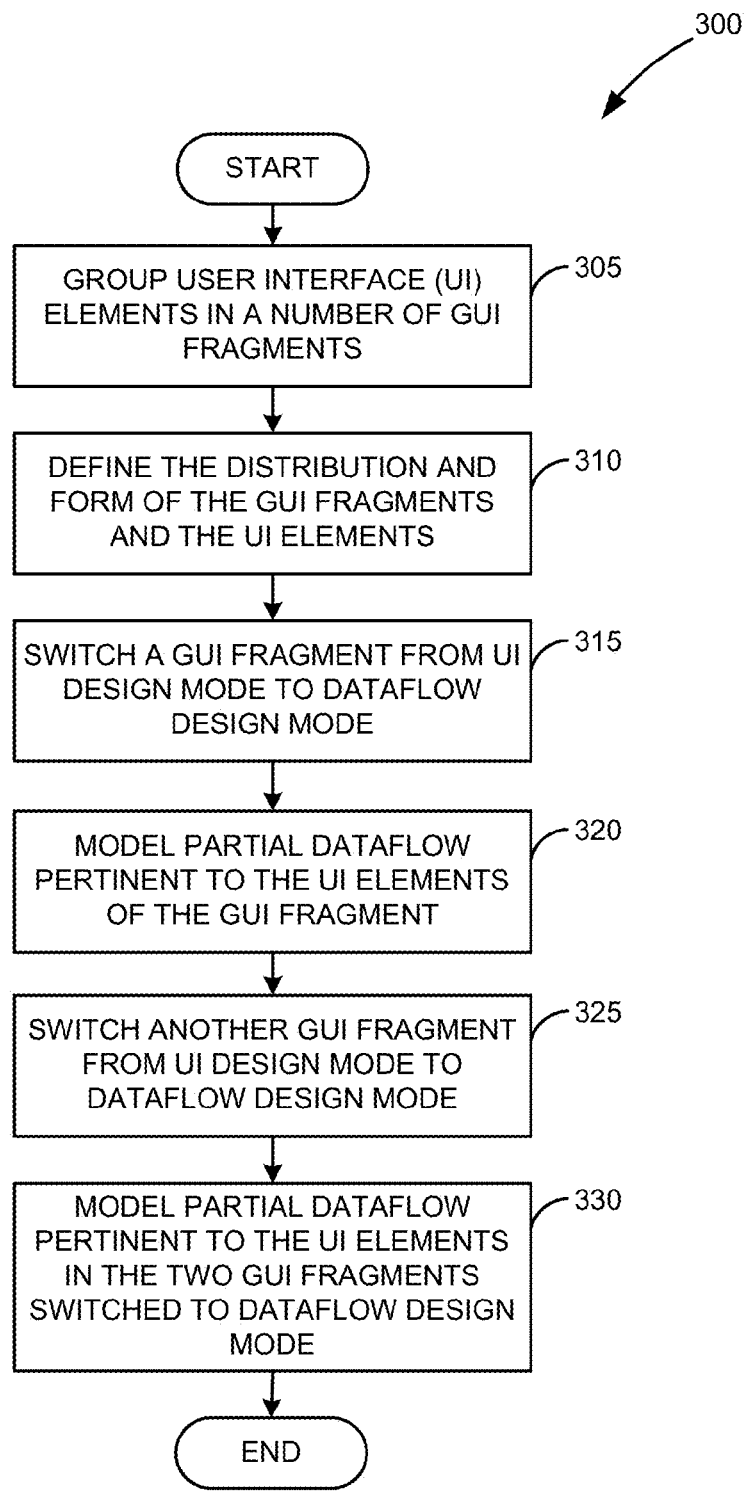
FIG. 3 illustrates a process for in-place UI and dataflow modeling, according to one embodiment.

FIG. 3 shows process 300 for in-place UI and dataflow modeling of software applications, according to one embodiment. At 305, a number of UI elements are grouped in several areas of a design canvas. The design canvas is a design area of a GUI builder tool or another similar graphical instrument for software design. The design area 210 of FIG. 2A and FIG. 2B is an example for a design canvas. The different areas of the design canvas are fragments of the GUI that is modeled. The GUI fragments in the design canvas could be delineated or determined by special UI elements, e.g., composite or container UI elements. Each of the GUI fragments may include at least one UI element. The container UI elements 225, 230 and 235 of FIG. 2A and FIG. 2B are examples of such GUI fragments. New UI elements may be inserted either directly from a UI toolset, or by key combination, or by selecting an appropriate menu command. Existing UI elements may be deleted, or moved from one GUI fragment to another. Referring again to FIG. 2A and FIG. 2B, exemplar UI elements 240, 245, 250, 255, 260 and 265 may be inserted in the corresponding GUI fragments by dragging-and-dropping from UI toolset 215, or by selecting appropriate commands from menu 220.

In FIG. 3, at 310, the form and the distribution of the UI elements, including the GUI fragments, are defined. According to one embodiment of the invention, nested UI elements could be defined as well. For example, one GUI fragment could be nested into another GUI fragment. Similarly, one UI element grouped in a GUI fragment could be nested or contained by another UI element in the same GUI fragment. The shape, the orientation, the type, the distribution, etc., of the UI elements in the design canvas may be defined. Alternatively, only the UI elements of a particular GUI fragment may be arranged. The shape and the distribution of the UI elements in the design area will be reproduced by the GUI of the running software application.

In the design canvas, one of the GUI fragments is switched from UI design mode to dataflow design mode at 315. The switch could be triggered by a user, e.g., by selecting a special UI control of the design tool, by pressing a hot key combination, by activating a menu command, by drag-and-drop of a dataflow element in the fragment, etc. For example, container UI element 225 in FIG. 2A in UI design mode switches to fragment 226 in FIG. 2B in dataflow design mode by selecting "switch" UI control 270. The rest of the GUI fragments remain in UI design mode, according to one embodiment of the invention. At 320 in FIG. 3, a part of a dataflow corresponding to the GUI of the software application is modeled. This part of the dataflow corresponds to the UI elements grouped in this GUI fragment. The part of the dataflow is a fragment of the entire dataflow, e.g., it is a fragment dataflow.

The in-place dataflow modeling technique respects the actual modeling context by only showing context relevant dataflow elements. Usually, one or more data elements of the fragment dataflow correspond to each UI element of the fragment. However, some of the data elements may not be visualized by UI elements. The data elements of the fragment dataflow are related by relationship elements to define the flow of information during the execution of the software application. A relationship element may correspond to a UI element as well, e.g., a UI element of the fragment in UI design mode may visualize either a data element or a relationship element of the fragment in dataflow design mode, or both. When adding a UI element to a GUI fragment in a UI design mode, one or more corresponding data elements and relationship elements may be automatically added to the dataflow design mode of the GUI fragment. The context sensitivity of the in-place dataflow modeling facilitates an efficient and intuitive dataflow design.

At 325, another GUI fragment in the design area is switched from UI design mode to dataflow design mode. At that stage, two of the GUI fragments in the design area are in dataflow design mode, while the rest GUI fragments, if any, are still in UI design mode. At 330, a part of the dataflow pertinent to both GUI fragments in dataflow design mode is modeled. Since the partial dataflow pertinent to the first GUI fragment is already designed at 320, the modeling that takes place at 330 is mostly concentrated at designing the partial dataflow pertinent to the second GUI fragment, and at establishing relationships between the two partial dataflows. One or more relationships between the two partial dataflows may be defined to connect at least one data element of the first partial dataflow to at least one data element of the second partial dataflow.

The switching of the second GUI fragment to dataflow design mode could be triggered by similar events or user actions to those that cause the switch of the first GUI fragment. Additionally, the second GUI fragment may switch to dataflow design mode as a result of a dragging of a dataflow element from the first fragment to the second fragment. The technique of drag-and-drop dataflow elements may be also used for establishing relationships between different data elements, including between data elements of different GUI fragments as illustrated with process 400 in FIG. 4, according to one embodiment.

At 405, a data element is selected in a first GUI fragment, when the GUI fragment is in dataflow design mode. At 410, the selected data element is dragged from the first GUI fragment to a second GUI fragment. The selection of a data element and its dragging could be accomplished by different means or combination of means, e.g., with a pointing device (a computer mouse, a trackball, a touch screen, etc.), a keyboard, menu commands, etc. Once the dragging reaches the area of the second GUI fragment, a check is performed to verify whether the second fragment is in dataflow design mode at 415. At 420, the second GUI fragment is switched automatically to dataflow design mode, if the verification is negative.

At 425, a look up or a search among the data elements currently included in the second GUI fragment is performed for data elements that are compatible with the selected data element. A relationship may be defined only between compatible data elements, according to one embodiment of the invention. At 430, a check is performed whether data elements compatible with the selected data element are found in the second GUI fragment. If compatible data elements are found, they may be highlighted at 435 to assist the definition of a relationship between the selected data element and one of the compatible data elements, according to one embodiment of the invention.

At 440, the selected data element is dragged to one of the compatible data elements in the second GUI fragment. In an alternative embodiment, the compatible data elements in the second GUI fragment may not be highlighted until the selected data element is dragged over or near one of them. Only the compatible data element to which the selected data element is dragged may be highlighted. At 445, the selected data element is dropped over a compatible data element in the second GUI fragment to create a relationship between the two data elements from different GUI fragments.

Drag-and-drop is an intuitive technique for defining relationships between data elements, which could be applied to data elements from different GUI fragments, as well as between data elements within the same GUI fragment. A relationship element may also be dragged from one GUI fragment to another for the purpose and with the effect as explained with respect to process 400. The drag-and-drop technique may be used for including new data elements, new relationship elements, and new UI elements in a GUI fragment, where the GUI fragment may automatically switch to the relevant design mode view when necessary. In one embodiment, the checking for compatible data may be used to decide when to automatically switch to a particular design view of a checked GUI fragment.

Figure 4:
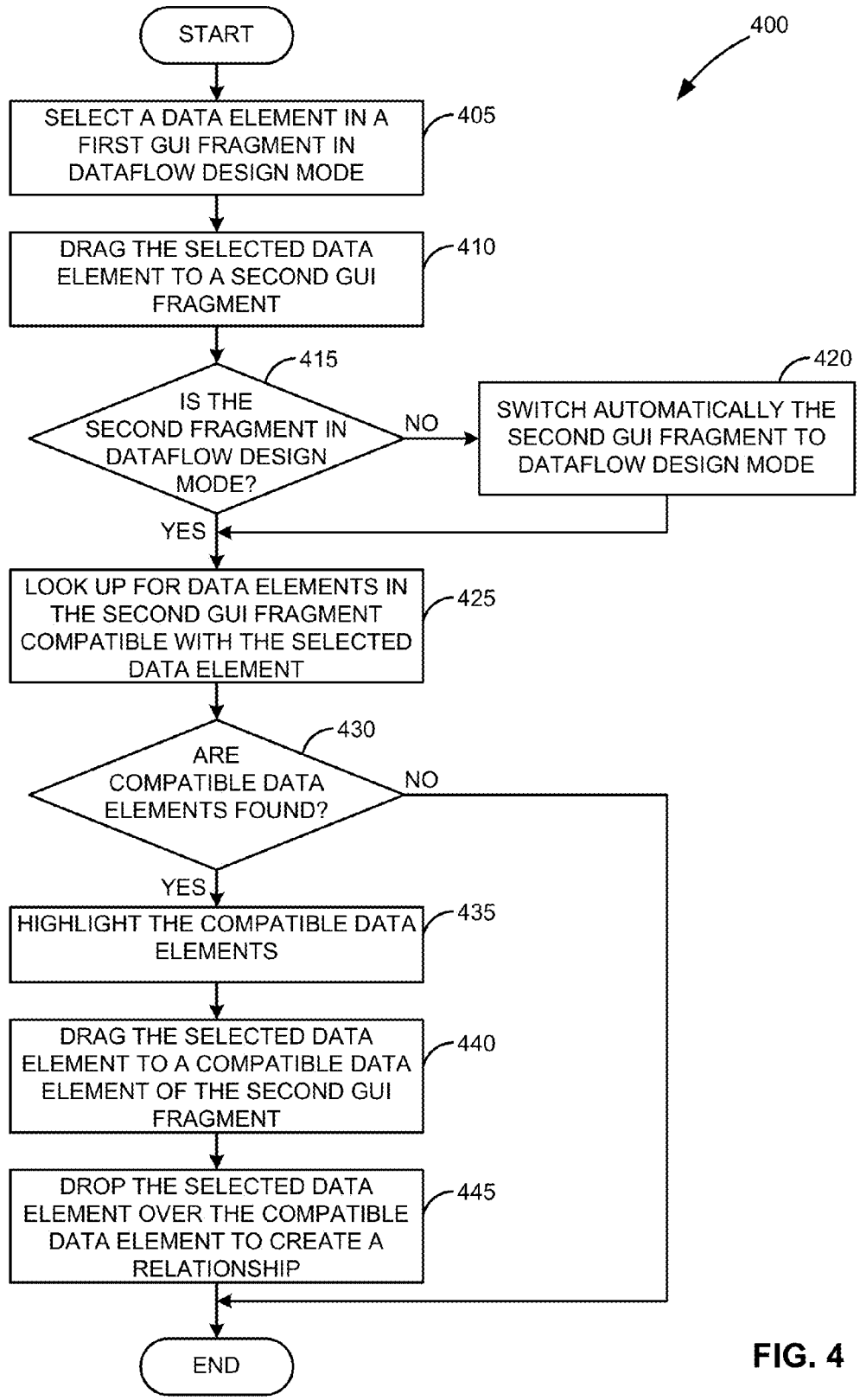
FIG. 4 illustrates a process for establishing a relationship between data elements of different GUI fragments by using drag-and-drop technique, according to one embodiment.

Processes 300 and 400 illustrated with FIG. 3 and FIG. 4, respectively, are based on a design approach where the in-place modeling of the dataflow of a software application follows the UI modeling. In an alternative embodiment of the invention, similar processes may be defined based on an approach where the in-place modeling of the dataflow of a software application is performed first, and the UI modeling is done according to the dataflow elements distribution. The switching of a GUI fragment between different design or view modes may not lead to a replacement of one or more UI elements with one or more dataflow elements, and vice versa, according to one embodiment. Instead, the UI elements of the GUI fragment may be prominently displayed, and the dataflow elements of the GUI fragment may be displayed as transparent or shaded, when the GUI fragment is in UI mode. Respectively, dataflow elements of the GUI fragment may be prominently displayed, and the UI elements of the GUI fragment may be displayed as transparent or as shaded when the GUI fragment is in dataflow mode.

Figure 5A:
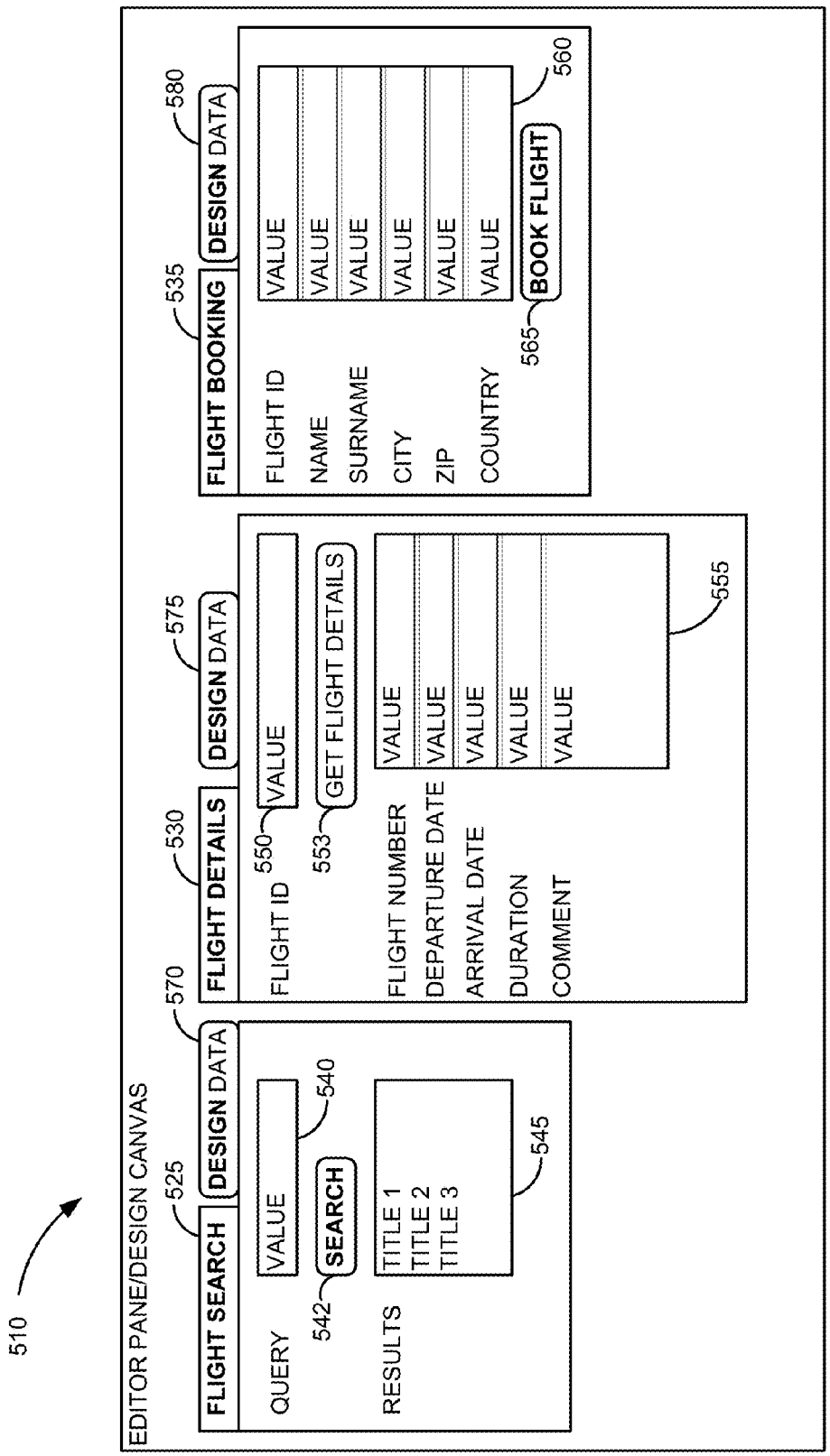
FIG. 5A is a block diagram illustrating a state of a design canvas during in-place UI and dataflow modeling, according to one embodiment.

FIG. 5A to FIG. 5E show different states of design canvas 510 where in-place UI and dataflow modeling of an exemplary software application is performed, according to one embodiment of the invention. Once again, the exemplary software application is for flight booking purposes. In FIG. 5A, design canvas 510 includes three GUI fragments, e.g., container UI elements, "flight search" 525, "flight details" 530 and "flight booking" 535 that are in UI design mode. GUI fragment "flight search" 525 groups UI elements "query" 540, "search" 542 and "result" 545. A value of search criteria may be entered in "query" UI control 540, and a search with this criteria may be launched by selecting "search" UI control 542. The UI element "result" 545 stores a list of the flights matching the search criteria, if any. The flights may be simply listed by title.

GUI fragment "flight details" 530 groups UI elements "flight ID" 550, "get flight details" 553, and "details" 555. A particular flight title from the "result" UI element 545 may be selected, causing the ID information for the selected flight to automatically appear in "flight ID" UI element 550. Alternatively, an ID of a particular flight may be entered directly in "flight ID" UI element 550. After the ID value for a particular flight is set at UI element 550, detailed information for this flight may be requested by activating, e.g., selecting, "get flight details" UI control 553. The details for the flight appear in "details" UI element 555 and may include values for flight number, departure date, arrival date, flight duration, additional comments, etc.

The selected flight may be booked using UI controls 560 and 565 in GUI fragment "flight booking" 535. Personal details may be entered or loaded in UI control 560, including passenger name, surname, city, ZIP code, country, etc. The booking of a particular flight is confirmed and submitted by selecting UI control "book flight" 565. Selectable UI controls 570, 575 and 580 are adjacent to each of the GUI fragments 525, 530 and 535, respectively, and may be used for switching between different design modes. The selectable UI controls 542, 553, 565, 570, 575 and 580 may be represented by GUI buttons selectable by GUI pointing device or by other means for UI interaction, according to one embodiment of the invention.

Figure 5B:
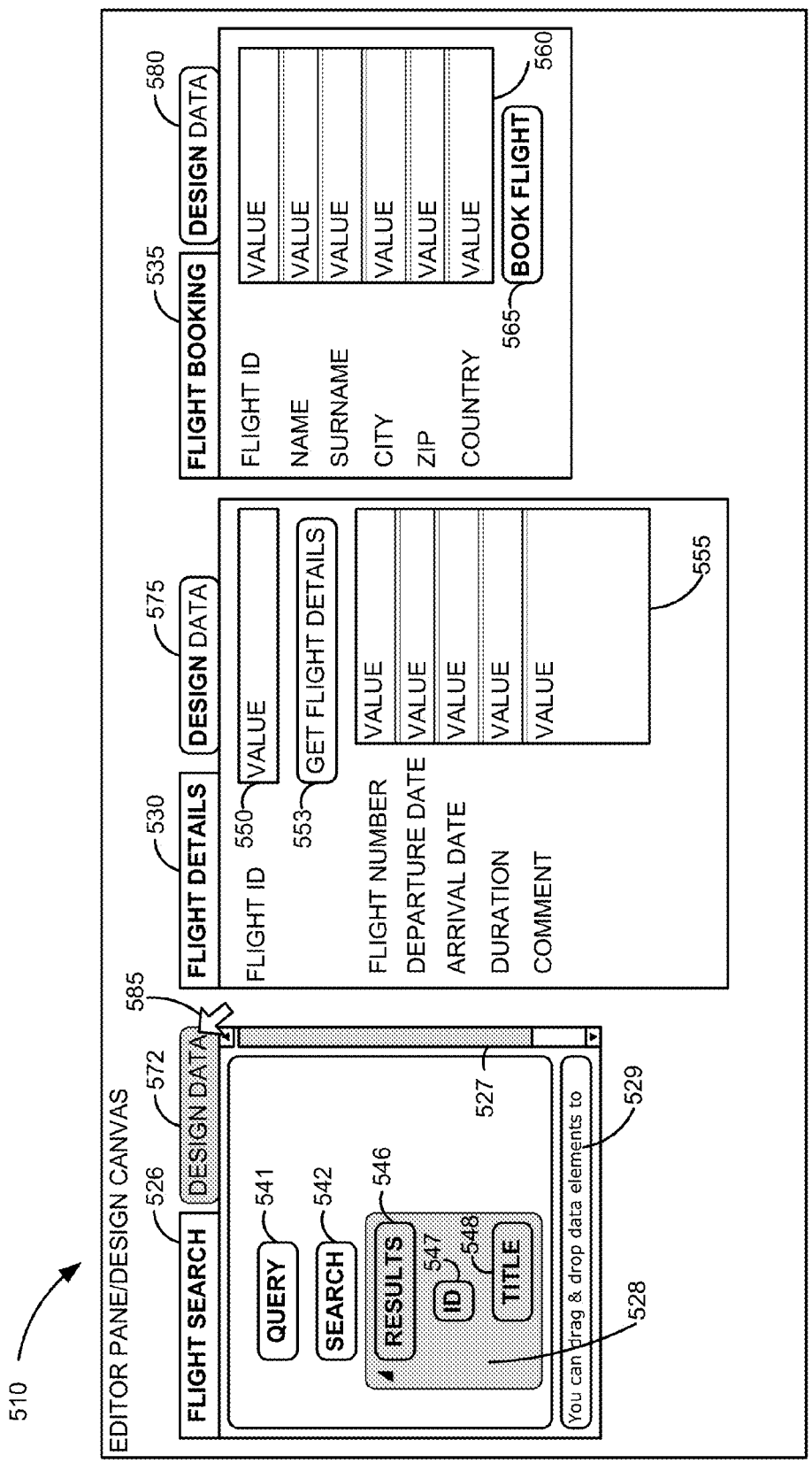
FIG. 5B is a block diagram illustrating a state of a design canvas during in-place UI and dataflow modeling, according to one embodiment.

In FIG. 5B, the GUI fragment "flight search" 525 from FIG. 5A is in dataflow design mode, represented by GUI fragment 526. The GUI fragment 525 in UI design mode was switched to GUI fragment 526 in dataflow design mode by selecting "switch" UI element 570 in FIG. 5A, according to one embodiment of the invention. The GUI fragment 526 may be toggled back to UI design mode by selecting "switch" UI element 572 in FIG. 5B. The selection of a UI element may be performed by a pointing device or by other means. Using a pointing device, pointer 585 may be moved over a UI control, causing that UI control to be highlighted as illustrated with "switch" UI control 572. The highlighting of a UI control may occur when the UI control is selected.

Data elements "query" 541, "search" 542, "result" 546, "ID" 547 and "title" 548 in GUI fragment 526 represent UI elements "query" 540, "search" 542 and "result" 545 in GUI fragment 525. Relationship element 528 defines a relationship between data element "result" 546, and data elements "ID" 547 and "title" 548. Vertical scroll UI element 527 may appear when some of the dataflow elements in GUI fragment 526 cannot be fully visualized. Horizontal scroll UI element may also be included, when necessary. Thus, as much space as needed to define a partial dataflow pertinent to the GUI fragment 526 may be secured. UI element 529 may provide help information, or any other human readable information to a user. Such information, as well as any other useful information may be provided via UI controls similar to tool tips, according to another embodiment of the invention.

Figure 5C:
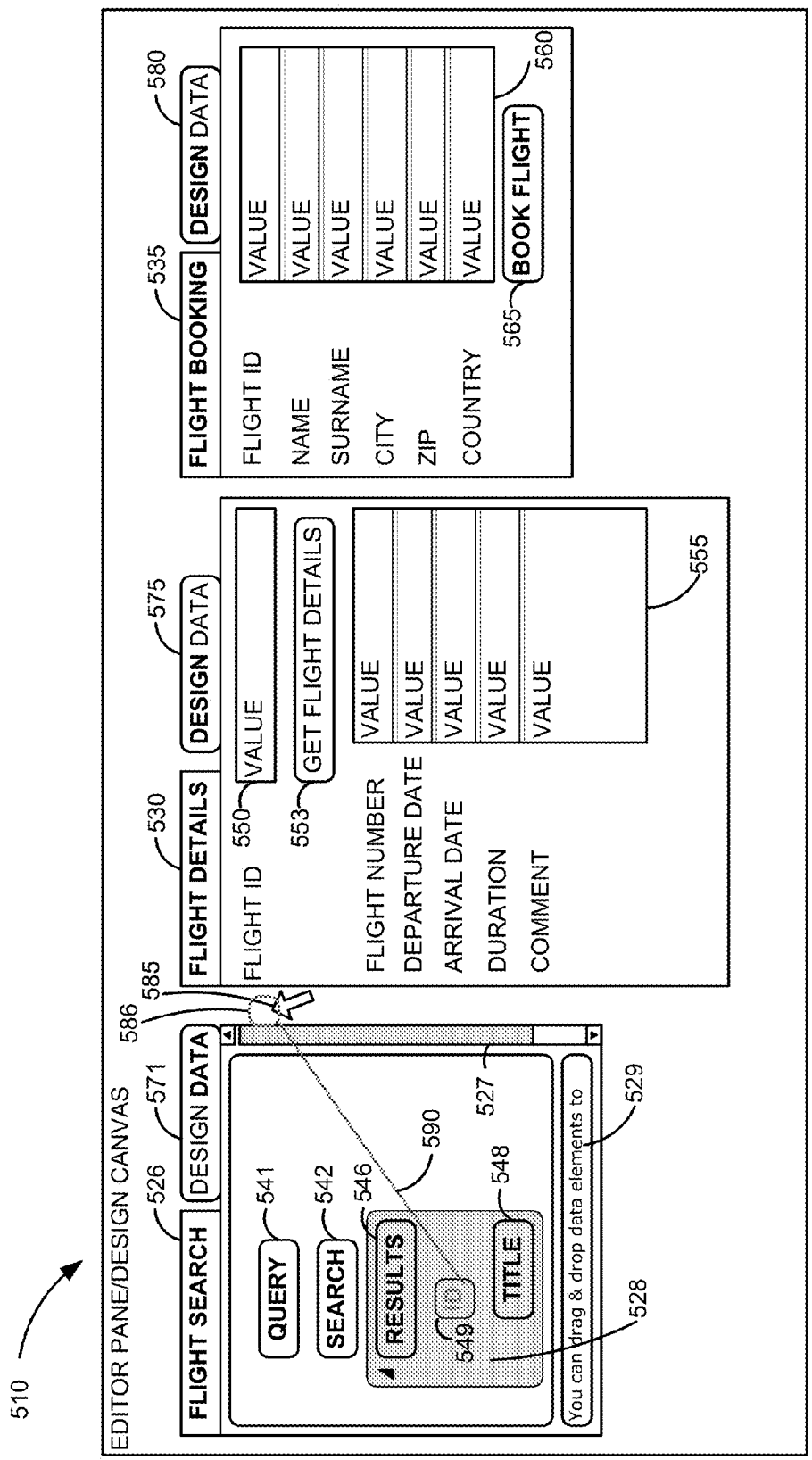
FIG. 5C is a block diagram illustrating a state of a design canvas during in-place UI and dataflow modeling, according to one embodiment.
Figure 5D:
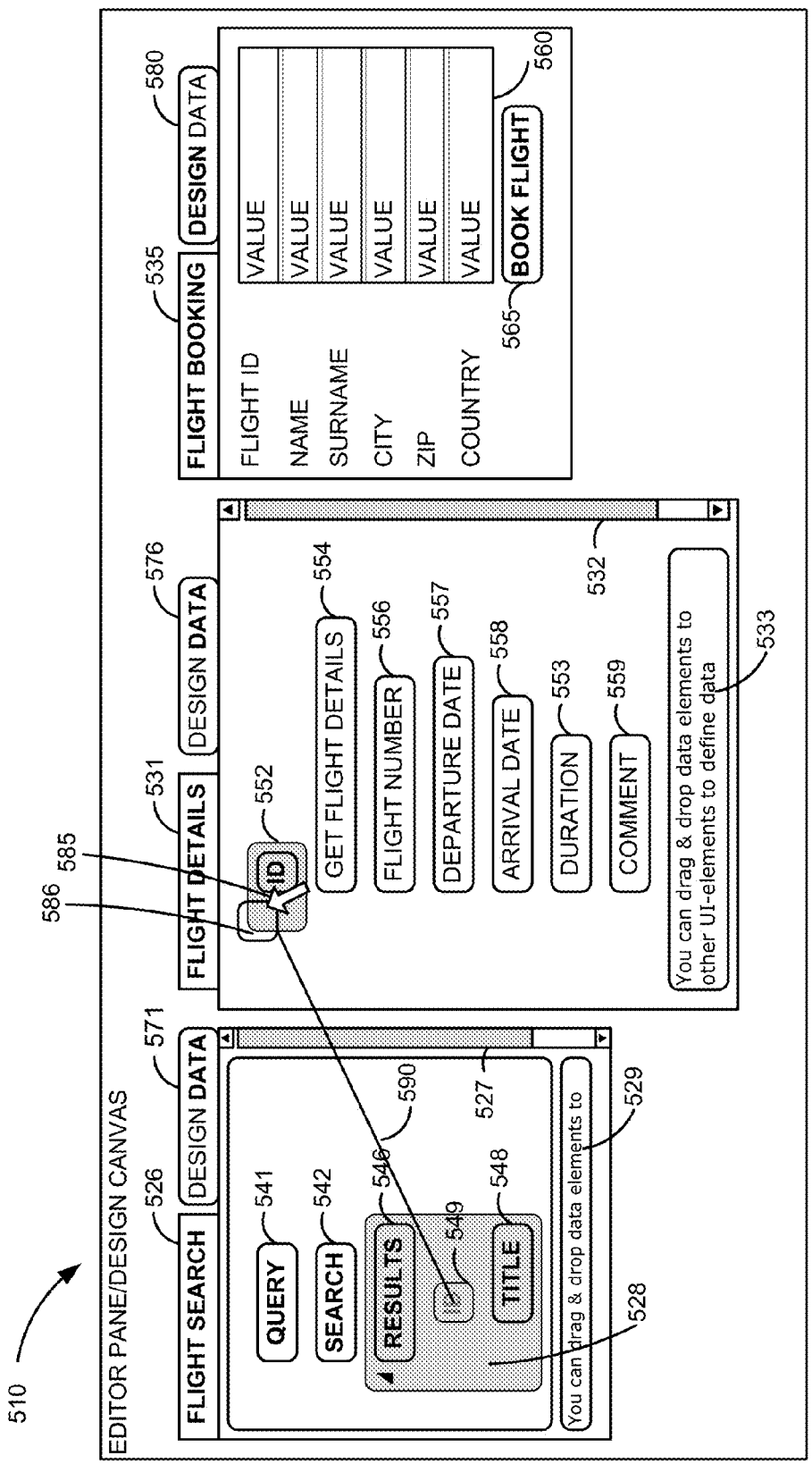
FIG. 5D is a block diagram illustrating a state of a design canvas during in-place UI and dataflow modeling, according to one embodiment.

FIG. 5C and FIG. 5D show the state of the design canvas 510 while drag-and-drop operation is performed, compliant with process 400 as described with respect to FIG. 4. Data element "ID" 547 in FIG. 5B is selected by a pointing device, and dragged towards GUI fragment 530. In FIG. 5C and FIG.

5D, the selection and the dragging of data element "ID" 547 is illustrated with data elements 549, 585, 586 and 590. Data element "ID" 549 represents data element "ID" 547 in a selected state. UI element 586 is a projection of data element "ID" 549 as it moves along with the dragging. Pointer 585 reflects the directions for movement received through a pointing device, or through other means. Finally, relationship element 590 spreads between data element "ID" 549 and its projection 586 to illustrate that if the drag-and-drop operation ends at a compatible data element, a relationship will be defined. UI element "switch" 571 for changing toggling the design modes is no longer highlighted since it is not selected and the pointer 585 is no longer above it.

In FIG. 5D, the dragging part of the drag-and-drop operation is illustrated in more advanced state. GUI fragment "flight details" 530 in FIG. 5A to FIG. 5C has switched to dataflow design mode represented with GUI fragment 531 in FIG. 5B. The flipping of GUI fragment 530 to dataflow design mode might happen automatically when the dragging of UI element 586, the projection of data element "ID" 549, had reached the GUI fragment 530. The GUI fragment 531 may be flipped back to UI design mode by selecting UI control "switch" 576.

The GUI fragment 531 includes data elements "ID" 552, "get flight details" 554, "flight number" 556, "departure date" 557, "arrival date" 558, "duration" 553 and "comment" 559. The data elements 552 to 559 correspond to UI elements "flight ID" 550, "get flight details" 553 and "details" 555, accordingly. No relationships between the data elements have been defined yet. Vertical scroll UI element 532 provides scrolling in order to expand the dataflow design area when necessary, and UI element 533 may provide help information (or any other readable information) to a user.

The data element "ID" 552 is in highlighted state to indicate a compatibility with data element "ID" 549. This means, that if the dropping part of the drag-and-drop operation is performed above the data element "ID" 552, a relationship between data element "ID" 552 and data element "ID" 549 may be defined.

Figure 5E:
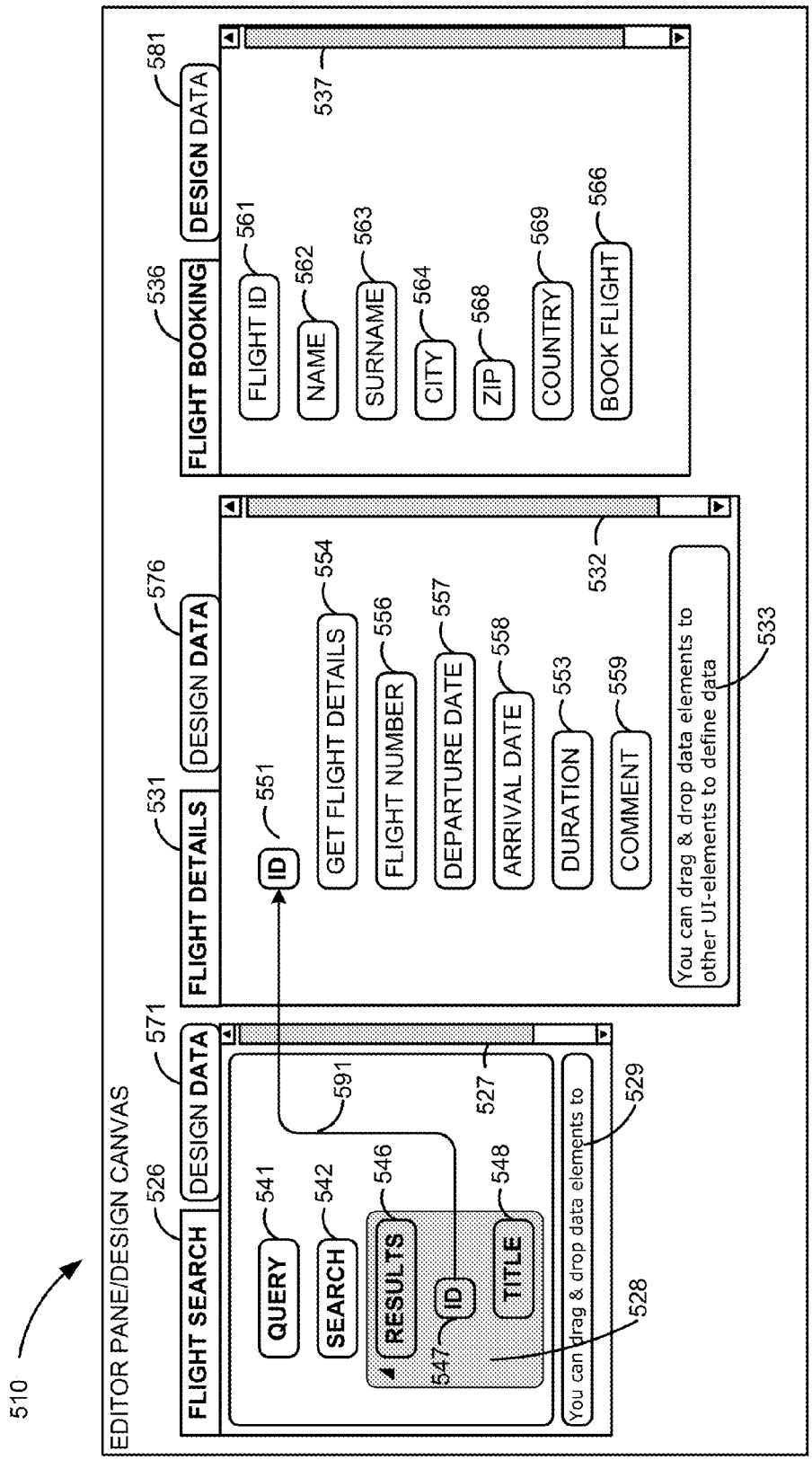
FIG. 5E is a block diagram illustrating a state of a design canvas during in-place UI and dataflow modeling, according to one embodiment.

FIG. 5E shows the state of the design canvas 510 when the drag-and-drop operation from FIG. 5C and FIG. 5D has been completed. Data element "ID" 547 from the partial dataflow in GUI fragment "flight search" 526 is connected with data element "ID" 551 from the partial dataflow in GUI fragment "flight details" 531 by relationship element 591. Data elements 547 and 551 in FIG. 5E correspond to data elements 549 and 552 in FIG. 5D.

GUI fragment "flight booking" 535 in FIG. 5A to FIG. 5D has been switched to dataflow design mode, represented by GUI fragment 536 in FIG. 5E. Data elements "flight ID" 561, "Name" 562, "Surname" 563, "City" 564, "ZIP" 568, "Country" 569, and "book flight" 566 in GUI fragment 536 correspond to UI elements 560 and 565 in GUI fragment 535, respectively. Scroll UI element 537 helps to expand the dataflow design area of GUI fragment 536. The changing from dataflow design mode to UI design mode of GUI fragment 536 may be performed by UI element "switch" 581.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other programming languages and development tools. Another embodiment of the invention may be implemented in hard-wired circuitry in place of, or in combination with machine readable software instructions.

Figure 6:
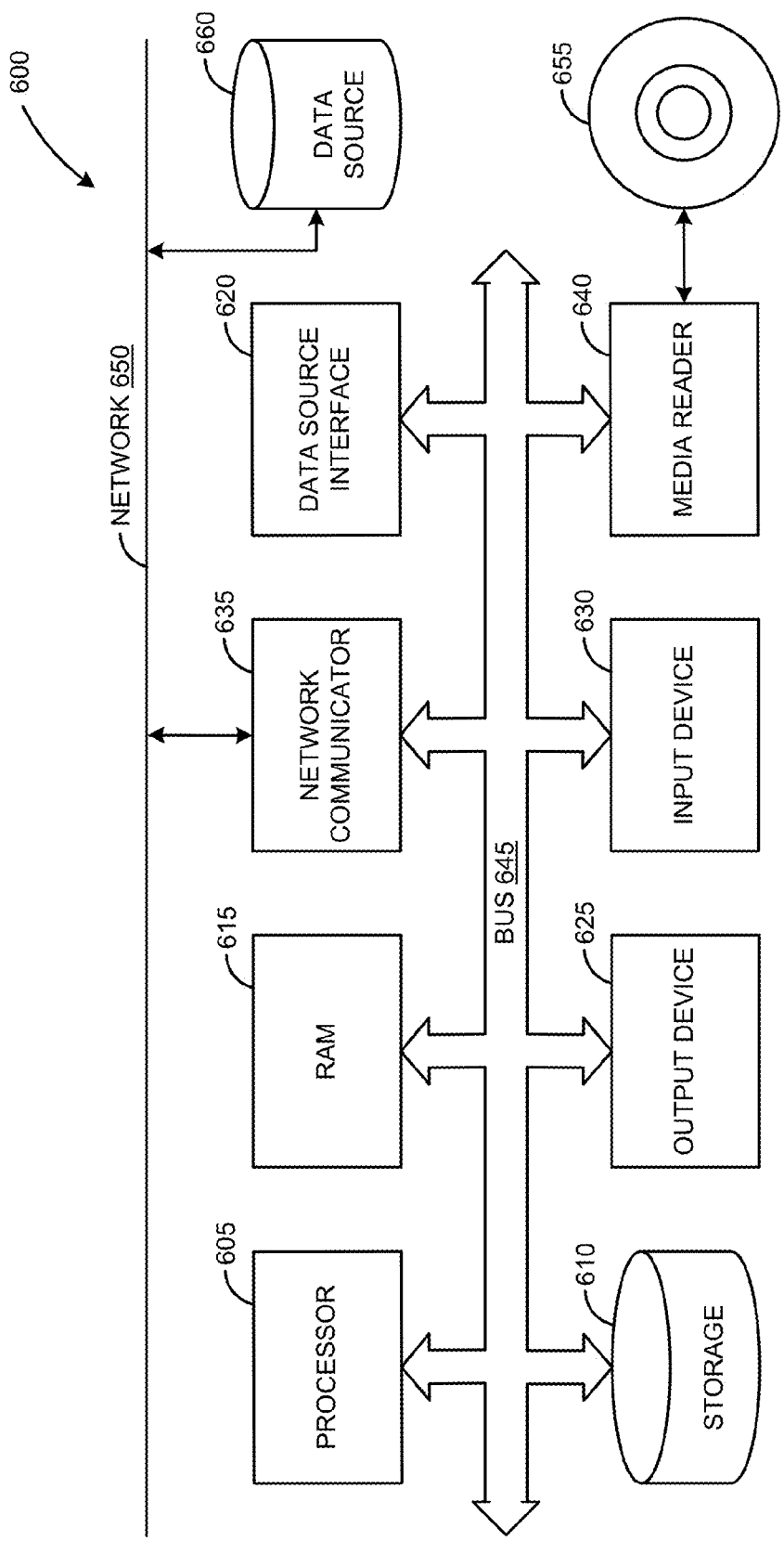
FIG. 6 is a block diagram of an exemplary computer system to execute computer readable instructions for in-place UI and dataflow modeling, according to one embodiment.

FIG. 6 is a block diagram of an exemplary computer system 600, according to one embodiment of the invention. The computer system 600 includes a processor 605 that executes software instructions or code stored on a computer readable storage medium 655 to perform the above-illustrated methods of the invention. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. The stored instructions may be further compiled to generate other representations of the instructions and dynamically stored in the RAM 615. The processor 605 reads instructions from the RAM 615 and performs actions as instructed. According to one embodiment of the invention, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed by network 650. In some embodiments the data source 660 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. An article of manufacture including a non-transitory tangible computer readable storage medium to store instructions, which when executed by a computer, cause the computer to:

group a plurality of user interface (UI) elements of a graphical user interface (GUI) in a plurality of GUI fragments, wherein each fragment of the plurality of GUI fragments includes at least one UI element;

display simultaneously, within a single design area, a first and a second fragment of the plurality of GUI fragments in a UI design mode, wherein a UI element of the first fragment is displayed in the first fragment and a UI element of the second fragment is displayed in the second fragment and, wherein the first and the second fragment can be separately switched from UI design mode to dataflow design mode and from dataflow design mode to UI design mode;

switch to display the first fragment from UI design mode to dataflow design mode to model a dataflow in-place with a UI;

in response to the switching of the first fragment from UI design mode to dataflow design mode, remove the UI element of the first fragment from the display, and display, in-place of the first fragment, at least one data element corresponding to the removed UI element of the first fragment, wherein the second fragment remains in UI design mode displayed in the single design area simultaneously with the first fragment that is switched to dataflow design mode;

separately from the first fragment, switch the second fragment from UI design mode to dataflow design mode; and in response to the switching of the second fragment from the UI design mode to the dataflow design mode, remove the UI element of the second fragment from the display, and display, in-place of the second fragment that is in second mode, at least one data element corresponding to the removed UI element of the second fragment.

2. The article of manufacture of claim 1, wherein the tangible computer readable storage medium stores further instructions, which when executed by a computer cause the computer to:

display an indicator of a relationship between a first data element of the first fragment and a second data element of the second fragment, wherein the relationship corresponds to a dataflow.

3. The article of manufacture of claim 1, wherein the tangible computer readable storage medium stores further instructions, which when executed by a computer cause the computer to:

switch to display the first fragment to the second mode upon receiving a selection of a first control element associated to the first fragment, or upon detecting a dragging of a data element or of a relationship element to the first fragment; and switch to display the second fragment to the second mode upon receiving a selection of a second control element associated to the second fragment, or upon detecting a dragging of a data element or of a relationship element to the second fragment.

4. The article of manufacture of claim 1, wherein displaying in the first fragment that is in second mode at least one data element pertinent to the UI element of the first fragment comprises:

removing the UI element of the first fragment from the display, and displaying the at least one data element in-place of the UI element of the first fragment.

5. The article of manufacture of claim 1, wherein displaying the indicator of the relationship between the first data element and the second data element comprises:

highlighting one or more of the first data element of the first fragment and the second data element of the second fragment.

6. The article of manufacture of claim 1, wherein switching to display the first fragment to the second mode comprises:
   displaying as shaded or as transparent a UI element of the first fragment, and
   prominently displaying the at least one data element over a display of the UI element.

7. A computer implemented method for in-place dataflow modeling comprising:
   grouping a plurality of user interface (UI) elements of a graphical user interface (GUI) in a plurality of GUI fragments in UI design mode, wherein each fragment of the plurality of GUI fragments includes at least one UI element;
   displaying simultaneously, within a single design area, a first and a second fragment of the plurality of GUI fragments in a UI design mode, wherein a UI element of the first fragment is displayed in the first fragment and a UI element of the second fragment is displayed in the second fragment and, wherein the first and the second fragment can be switched from UI design mode to dataflow design mode and from dataflow design mode to UI design mode;
   switching the first fragment from UI design mode to dataflow design mode to model a dataflow in-place with a UI;
   in response to the switching of the first fragment from UI design mode to dataflow design mode, removing the UI element of the first fragment from the display and displaying, in-place of the first fragment, at least one data element corresponding to the removed UI element of the first fragment, wherein the second fragment remains in UI design mode displayed in the single design area simultaneously with the first fragment that is switched to dataflow design mode;
   separately from the first fragment, switching the second fragment from UI design mode to dataflow design mode;
   in response to the switching of the second fragment from the UI design mode to the dataflow design mode, removing the UI element of the second fragment from the display and displaying, in-place of the second fragment that is in second mode, at least one data element corresponding to the removed UI element of the second fragment; and
   creating a relationship between a first data element of the first fragment and a second data element of the second fragment.

8. The method of claim 7 further comprising:
   creating a relationship between a plurality of data elements of the first fragment or between a plurality of data elements of the second fragment.

9. The method of claim 7 further comprising:
   grouping a plurality of controls for designing a UI in a first area of the GUI, wherein the plurality of controls include at least one general UI element; and
   grouping a plurality of controls for designing dataflow in a second area of the GUI, wherein the plurality of controls include at least one general data element or at least one general relationship element, or both.

10. The method of claim 7, wherein switching the first fragment to dataflow design mode comprises:
    switching the first fragment between a plurality of modes upon a condition selected from a group consisting of:
    receiving a selection of a switch control element;
    receiving a selection of a control for designing a UI;
    receiving a selection of a control for designing a dataflow;
    detecting a dragging of a control for designing a UI to the first fragment; and
    detecting a dragging of a control for designing a dataflow.

11. The method of claim 7, wherein switching the second fragment to dataflow design mode comprises:
    switching the second fragment between a plurality of modes upon a condition selected from a group consisting of:
    receiving a selection of a switch control element;
    receiving a selection of a control for designing a UI;
    receiving a selection of a control for designing a dataflow;
    detecting a dragging of a control for designing a UI to the second fragment;
    detecting a dragging of a control for designing a dataflow to the second fragment;
    detecting a dragging of a UI element from the first fragment to the second fragment;
    detecting a dragging of a data element from the first fragment to the second fragment;
    detecting a dragging of a relationship element from the first fragment to the second fragment; and
    receiving a selection of a relationship element corresponding to a relationship between a data element of the first fragment and a data element of the second fragment.

12. The method of claim 7, wherein creating the relationship between the first data element and the second data element comprises:
    creating the relationship between the first data element of the first fragment and the second data element of the second fragment upon receiving a selection of the first data element and the second data element.

13. The method of claim 7, wherein creating the relationship between the first data element and the second data element comprises:
    creating the relationship between the first data element of the first fragment and the second data element of the second fragment upon detecting a dragging of the first data element from the first fragment to the second data element.

14. The method of claim 7, wherein creating the relationship between the first data element and the second data element comprises:
    highlighting the second data element of the second fragment upon receiving a selection of the first data element of the first fragment, wherein the highlighting indicates compatibility.

15. The method of claim 7, wherein creating the relationship between the first data element and the second data element comprises:
    highlighting the second data element of the second fragment upon detecting a dragging of the first data element from the first fragment to the second fragment, wherein the highlighting indicates compatibility.

16. The method of claim 7, wherein creating the relationship between the first data element and the second data element comprises:
    creating the relationship between the first data element of the first fragment and the second data element of the second fragment upon detecting a dragging of a relationship element connected to the first data element from the first fragment to the second data element.

17. The method of claim 7, wherein creating the relationship between the first data element and the second data element comprises:
highlighting the second data element of the second fragment upon detecting a dragging of a relationship element connected to the first data element from the first fragment to the second fragment, wherein the highlighting indicates compatibility.

18. A computer system, the system including:
a memory to store computer executable instructions; and
a processor coupled to the memory to execute the instructions to generate on an electronic display device a graphical user interface (GUI) for in-place dataflow modeling, the GUI comprising:
a first container element of a plurality of user interface (UI) container elements, wherein, separately and independently from the rest of the plurality of container elements, contents of the first container element changes between a plurality of modes upon receiving a selection of a first switch control;
a second container element of the plurality of UI container elements, wherein, separately and independently from the rest of the plurality of container elements, contents of the second container element changes between the plurality of modes upon a selection of a second switch control;
at least one UI element within the first container element when the first container element is in a first mode of the plurality of modes;
at least one data element within the first container element, when the first container element is in a second mode of the plurality of modes;
at least one user UI element within the second container element when the second container element is in the first mode of the plurality of modes;
at least one data element within the second container element, when the second container element is in the second mode of the plurality of modes; and
an indicator for a relationship between a data element of the first container element and a data element of the second container element, when the first container element is in the second mode.

19. The GUI of claim 18 further comprising:
a first toolset area grouping a plurality of controls for designing a UI, wherein the plurality of controls include at least one general UI element; and
a second toolset area grouping a plurality of controls for designing dataflow, wherein the plurality of controls include at least one general data element or at least one general relationship element, or both.

20. The GUI of claim 18, wherein the second container element is nested within the first container element.

* * * * *